United States Patent
Yamamoto

(10) Patent No.: US 6,886,323 B2
(45) Date of Patent: May 3, 2005

(54) FIXING STRUCTURE BETWEEN LINK AND PIN IN CRAWLER BELT, AND FIXING METHOD THEREOF

(75) Inventor: Teiji Yamamoto, Osaka-fu (JP)

(73) Assignee: Komatsu Limited, Tokyo (JP)

( * ) Notice: Subject to any disclaimer, the term of this patent is extended or adjusted under 35 U.S.C. 154(b) by 224 days.

(21) Appl. No.: 10/291,917

(22) Filed: Nov. 11, 2002

(65) Prior Publication Data

US 2003/0101711 A1 Jun. 5, 2003

(30) Foreign Application Priority Data

Dec. 3, 2001 (JP) ........................................ 2001-368664

(51) Int. Cl.[7] ............................ F16G 13/06; B21L 9/06; B62D 55/12
(52) U.S. Cl. ................................ 59/7; 59/901; 305/202; 305/220; 29/520
(58) Field of Search ............................ 59/7, 901; 29/517, 29/520; 305/202, 220

(56) References Cited

U.S. PATENT DOCUMENTS

| | | | | |
|---|---|---|---|---|
| 3,699,637 A | * | 10/1972 | Rosiek | 29/520 |
| 4,125,298 A | * | 11/1978 | Heurich et al. | 29/520 |
| 5,183,318 A | * | 2/1993 | Taft et al. | 305/185 |
| 5,201,171 A | | 4/1993 | Anderton et al. | |
| 6,270,173 B1 | | 8/2001 | Hashimoto et al. | |
| 6,457,304 B1 | | 10/2002 | Bedford et al. | |

FOREIGN PATENT DOCUMENTS

| | | |
|---|---|---|
| JP | 5-213237 | 8/1993 |
| JP | 2000-153789 | 6/2000 |

* cited by examiner

Primary Examiner—David Jones
(74) Attorney, Agent, or Firm—Michael S. Leonard; Everest Intellectual Property Law Group

(57) ABSTRACT

In a crawler belt comprising pairs of opposite links connected endlessly via pins press-fitted into the links, fixing surfaces of pins or links are successively pressed and deformed from the fixing surfaces in an axial direction along the circumferences inside or outside of openings of pin-press-fitting holes by means of local pressing in the axial direction, whereby the end portions of the pins or part of the circumferences of the openings in the links are expanded or narrowed in diameter. The expanded or narrowed portions are fixedly engaged with the opposing engaging spaces. The surface hardness of the expanded or narrowed portions is set to be lower than that of the other portions. With such structure and method, the links and pins can be easily and firmly connected with sufficient holding force in the axial direction, securing accurate, quick and easy fixing of pins and assembling of pins and links.

10 Claims, 15 Drawing Sheets

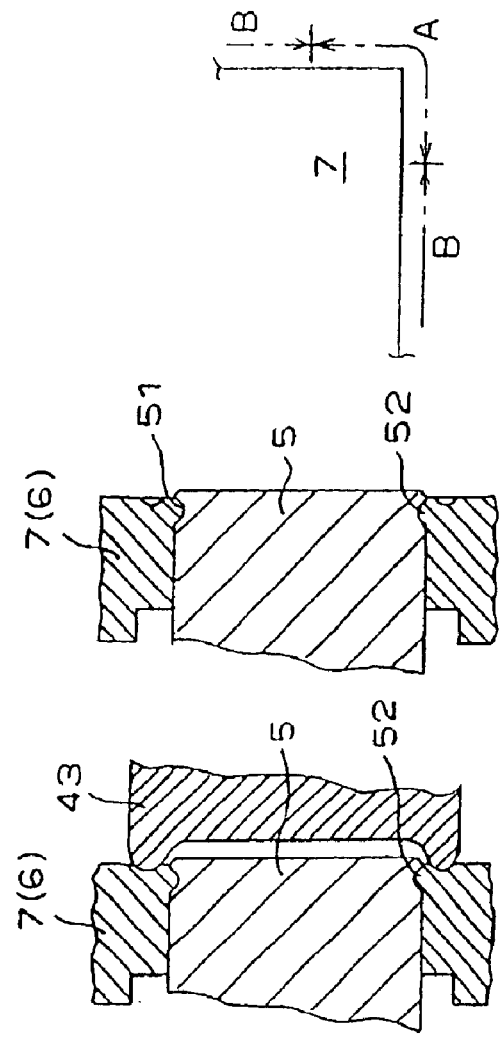

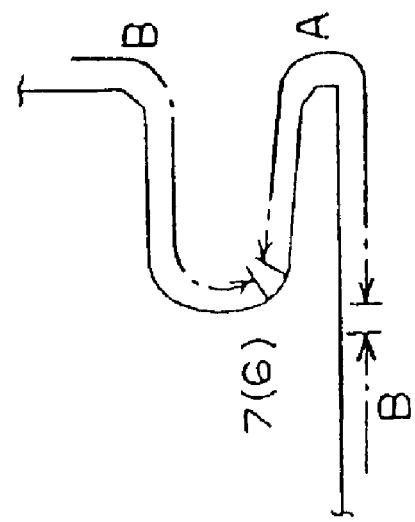
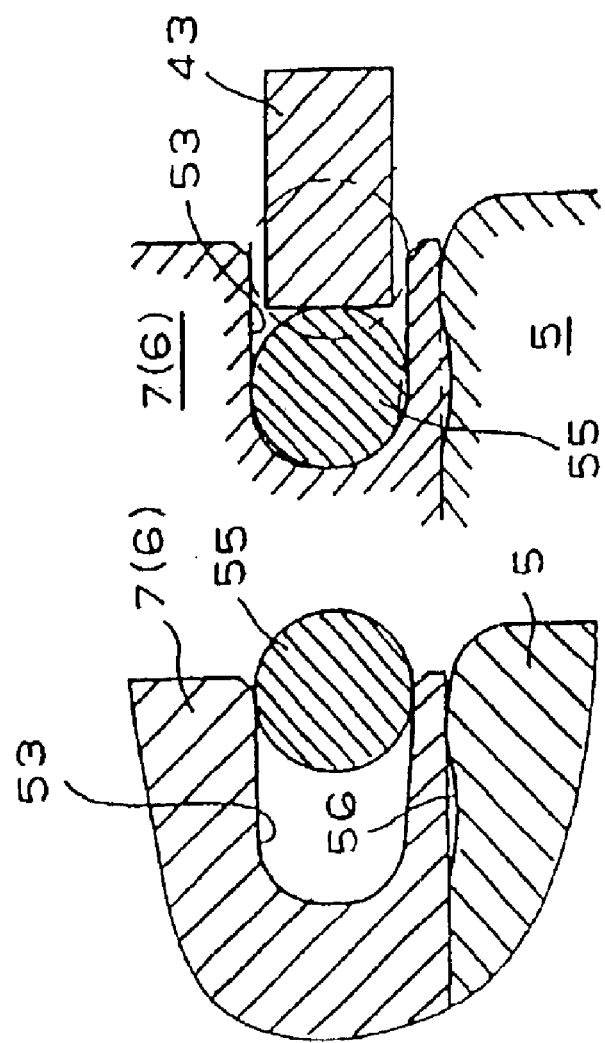
FIG.12A  FIG.12B  FIG.12C (b)

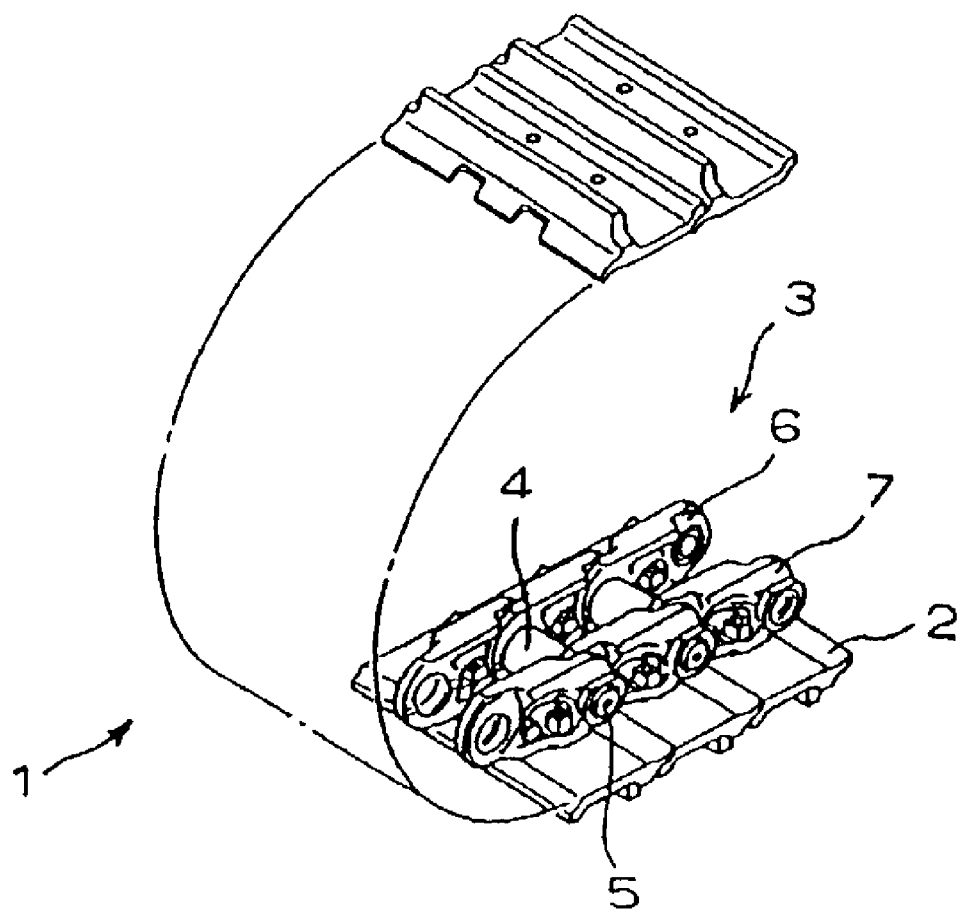

FIXING STRUCTURE BETWEEN LINK AND PIN IN CRAWLER BELT, AND FIXING METHOD THEREOF

BACKGROUND OF THE INVENTION

1. Field of the Invention

The present invention relates to fixing structure and fixing method between a link and a pin in a crawler belt which is used in a track-type vehicle.

2. Description of the Related Art

Conventionally, as shown in FIG. 15, in a crawler belt 1 which is used for a track-type vehicle in a work machine such as a bulldozer or a tractor, a plurality of track blocks 2 to contact the ground surface are mounted to an endless link chain 3 by means of bolt fastening. Then, as shown in FIG. 2 in which a part of the link chain is being exploded, when the crawler belt is being assembled, a bushing 4 is interposed between connecting portions of opposing links 6 and 7 and end portions of the bushing 4 are inserted into bushing insertion holes 34. In this state, a pin 5 is being inserted into the bushing 4. Further, end portions of the pin 5 protruding from the bushing 4 are inserted into pin insertion holes 32 and 33 of another pair of links 6 and 7 to be connected, whereby the links 6 and 7 and the pin 5 are connected and fixed to each other so as to form a joint.

With respect to the connection and the fixation of the link and the pin, Japanese Patent Application Laid-Open No. 5-213237 and Japanese Patent Application Laid-Open No. 2000-153789, of which invention was invented by the applicant of the present application and the other inventors, suggested a holding and fixing structure and a method thereof.

According to the invention as described in Japanese Patent Application Laid-Open No. 5-213237 mentioned above, there was proposed a structure which holds a link and a pin by pressing a boss of the link in a radial direction thereby protruding at least one small lump into an annular groove which was formed in a substantially arcuate shape along and around each of end portions of the pin, by means of a punch apparatus which is arranged so as to face an outer peripheral surface of the boss of the link while being aligned in the radial direction.

According to the invention as described in Japanese Patent Application Laid-Open No. 2000-153789 mentioned above, a part of an outer fixing end surface of a pin or a link is pressed in an axial direction and the pressing portion is plastically deformed in a pressing direction, so that a protruding portion is formed in a diametrical direction. Then, the link and the pin are connected and fixed to each other by allowing the protruding portion to be formed in the link or the pin, which is an opposing member to be inserted in, and by forming the protruding portion toward an engagement space which prevents a relative movement between the pin and the link in the axial direction.

According to the last-mentioned prior art, in comparison with the holding structure between the link and the pin in the first-mentioned prior art, it is possible to achieve firmer connection between the link and the pin even when the press-fitting force of the pin into the pin-press-fitting hole in the link is reduced, and it is possible to sufficiently secure the holding force of the link with respect to the axial direction of the pin. Accordingly, excellent operation and effect can be achieved in the connection and the fixation between the link and the pin.

However, in the last-mentioned prior art, formation is performed while a surface hardness of a portion to be plastically deformed is the same as a surface hardness of a portion not to be plastically deformed. Accordingly, in order to form the protruding portion in the diametrical direction by means of the plastic deformation, a great pressing force was required. That is, as a preliminary stage for performing the press-fitting and fixing, hardening and tempering are applied to the link or the pin, whereby the surface hardness thereof is increased. When the hardening and the tempering are applied, the surface hardness of the link becomes HRC 30 to 45 (HRC: Rockwell hardness), and the surface hardness of the pin becomes HRC 53 to 63. Conventionally, with these surface hardness, the protruding portion in the diametrical direction is formed by pressing the fixing end portion of the link or the pin in the diametrical direction or in the axial direction thereby plastically deforming the pressing portion.

Accordingly, in order to form a protruding portion in the diametrical direction by means of plastic deformation, pressing force corresponding to the surface hardness was required. Further, since plastic deformation is applied to the portion in which the surface hardness is high, there was a risk that a brittle fracture is generated in the plastically deformed portion, for example, by applying a strong pressing force at a stroke so as to perform plastic deformation. On the contrary, there was a problem that a long time is required for processing, in the case that pressing force is applied little by little while preventing brittle fracture from being generated. Accordingly, a special skill has been required for achieving stable fixation between the link and the pin.

SUMMARY OF THE INVENTION

The present invention aims to improve a fixing structure and a fixing method that are described in the prior art publications as mentioned above. Accordingly, the present invention has an object to provide a fixing structure between a link and a pin in a crawler belt which can reduce pressing force for the purpose of plastic deformation as well as achieve firm fixing between the link and the pin in the crawler belt.

The object of the present invention as mentioned above can be achieved by the followings.

That is, according to the first aspect of the present invention, there is provided a fixing structure between a link and a pin in a crawler belt, wherein a fixing is carried out by plastically deforming a pin end surface or a part of a peripheral edge of a pin-press-fitting hole formed at a fixing portion between the pair of links in a radial direction crossing a center of the pin, wherein a surface hardness of at least a partial surface of the portion to be plastically deformed is set to be lower than a surface hardness of a surface of a portion not to be plastically deformed in the pin or the link before being plastically deformed.

According to the present invention, since the surface hardness of at least the partial surface of the portion to be plastically deformed is set to be lower than the surface hardness of the surface of the non-plastically deformed portion in the pin or the link, it is easy to form a protruding portion, which is to be engaged with a link mounting portion in the pin or a pin mounting portion in the link, by the plastic deformation with a pressing force. Accordingly, the pressing force for achieving plastic deformation can be reduced, and it is possible to prevent such a risk that brittle fracture is generated in the plastically deformed portion. Further, it is possible to shorten a working time. Still further, the protruding portion can be easily plastically deformed due to the reduction of the surface hardness, so that it is possible to form the protruding portion in such a shape that corresponds with the link mounting portion of the pin or the pin mounting portion of the link. Accordingly, since it is possible to increase a contact surface area of the mounting portion and the protruding portion engaged therewith, the holding and fixing force in the mounting portion and the protruding portion engaged therewith can be received in a large surface area portion, so that the holding force for preventing the pin and the link from coming off can be less per unit area. Therefore, even when the surface hardness of the plastically deformed portion is set to be low, it is possible to keep a stronger removal-preventing holding force and fixing force in comparison with the case that the surface hardness is not low.

In addition, the holding force can be largest because the size of the protruding portion and the mounting portion corresponding therewith can be optionally set. As a result, it is possible to completely prevent a relative movement between the pin and the link caused by impact which is applied to a normal-type crawler belt from the outside and no play is generated therebetween. Therefore, even when each of the links is subject to an impact or the like in an axial direction which is applied by a flange portion of a lower roller in a vehicle body, a roller guard and the like, it is possible to prevent deformation or damage of a seal member for lubricating oil which is arranged in a joint portion of each of the links, as well as deformation of a spacer for preventing the seal member from collapsing. Thus, it is possible to sufficiently secure durability as a link chain.

Further, the protruding portions may be plural, which are formed in a peripheral direction of the pin or the link by means of the plastic deformation, or the protruding portion may be formed in the peripheral direction with a predetermined length.

Further, according to the present invention, it is preferable that the fixing structure between the link and the pin in the crawler belt is structured such that the surface hardness of the partial surface is formed by lowering the hardness by annealing.

In the present invention, since the surface hardness of at least the partial surface in the portion to be plastically deformed is made lower than the surface hardness of the surface of the non-plastically deformed portion in the link or the pin by means of annealing, it is possible to lower the surface hardness of only the portion required for plastically deforming. Further, in the annealing method, since the annealing can be easily performed by applying heat using heating means such as an induction heating which can heat the necessary portion required to be heated, and then by slowly cooling, it is easy to form the annealed portion and productivity is excellent. In the annealing, it is possible to employ any other suitable annealing means than the induction heating that can anneal only the portion required to be heated. Thus, it is possible to set the surface hardness of the annealed portion to be an optimum hardness by adjusting the heating time and the heating temperature to anneal the plastically deformed portion.

Further, according to the present invention, it is preferable that the fixing structure between the link and the pin in the crawler belt is structured such that the surface hardness of the partial surface in the pin is set to be HRC 25 to 40, and the surface hardness of the surface of the non-plastically deformed portion in the pin is set to be HRC 53 to 63.

According to the present invention, it is possible to keep an excellent strength of an entire pin as well as to easily perform the plastic deformation in order to form the protruding portion. Further, since it is possible to form the protruding portion in such a shape that corresponds with a pin mounting portion in the link, it is possible to increase the contact surface area of the mounting portion and the protruding portion to be engaged therewith. Accordingly, the holding and fixing force in the mounting portion and the protruding portion engaged therewith can be received in a large surface area portion, so that the holding force for preventing removal of the pin and the link per unit area can be an excellent value in terms of strength.

Furthermore, according to the present invention, it is preferable that the fixing structure between the link and the pin in the crawler belt is structured such that the surface hardness of the partial surface in the link is set to be HRC 25 to 40, and the surface hardness of the surface of the non-plastically deformed portion in the link is set to be HRC 30 to 45.

In the present invention, it is possible to keep an excellent strength of an entire link as well as to easily perform the plastic deformation in order to form the protruding portion. Further, since it is possible to form the protruding portion in such a shape that corresponds with a link mounting portion in the pin, it is possible to increase the contact area of the mounting portion and the protruding portion engaged therewith. Accordingly, the holding and fixing force in the mounting portion and the protruding portion engaged therewith can be received in a large surface area portion, so that the holding force for preventing removal of the pin and the link per unit area can be an excellent value in terms of strength.

Still further, according to the present invention, it is preferable that the fixing structure between the link and the pin in the crawler belt is structured such that a plastic deformation is made by a pressing force in a direction parallel to a central axis of the pin, thereby fixing the link and the pin.

According to the present invention, the protruding portion is formed by pressing a part of the portion of the pin or the link which is plastically deformed in the axial direction. Therefore, the relative holding force of the pin and the link with respect to the axial direction can be secured with a sufficient strength by the engagement of the link mounting portion in the pin or the pin mounting portion in the link with the protruding portion.

Further, if not only the protruding portion is allowed to be formed in the link mounting portion in the pin or the pin mounting portion in the link but also an engagement space which prevents the pin and the link from relatively moving in the axial direction is formed, the protruding portion protrudes toward the engagement space and is engaged in the space due to the pressing of the end surface. The engagement space at this time can be optionally formed as far as it is within the area in which the protruding portion is formed in the pin or the link, and no specific working accuracy is required.

According to a second aspect of the present invention, there is provided a fixing method between a link and a pin in a crawler belt in which a fixing is carried out by plastically deforming a pin end surface or a part of a peripheral edge of a pin-press-fitting hole formed at a fixing portion between the pair of links in a radial direction crossing a center of the pin, comprising the steps of: applying a surface treatment to a partial surface of a pin end surface or a peripheral edge of the pin-press-fitting hole such that a surface hardness of the partial surface becomes lower than a surface hardness of a surface of a portion not to be plastically deformed in the pin or the link; press-fitting the pin into the in-press-fitting hole of the bushing and the link; and fixing the link and the pin by plastically deforming the partial surface which is surface treated in a radial direction connecting a center and a periphery of the pin.

In the present invention, after the pin is press-fitted into the pin-press-fitting hole in the link, a pressing jig for fixing is arranged to oppose to a fixing end surface of the pin or the link, the fixing end surface of the pin or the link is pressed by the fixing pressing jig so that a part of the fixing end surface of the pin or the link is plastically deformed. Further, the surface of the plastically deformed portion is surface treated in advance in order that the surface hardness thereof can be lower than the surface hardness of the other portions.

As the surface treatment, annealing may be employed. By means of annealing, only a small pressing force for plastically deforming is required, as well as it is possible to increase a contact area between the portion which is plastically deformed so as to protrude in the diametrical direction and the mounting portion. Therefore, only a small holding force is required for preventing removal of the pin and the link per unit area in the contact area portion, so that the holding force for the removal prevention can be an excellent value in terms of strength.

Further, according to the present invention, it is preferable that a plastic deformation is made by a pressing force in a direction parallel to a central axis of the pin.

According to the present invention, the portion to be plastically deformed is surface treated so that the surface hardness thereof becomes smaller than the surface hardness of the non-plastically deformed portion, and thereafter the portion to be plastically deformed is deformed in the radial direction connecting the center and the periphery of the pin by applying the pressing force to the pin and the link in the direction parallel to the central axis of the pin. Accordingly, only a small pressing force is required for plastically deforming, as well as it is possible to increase the contact area between the portion which is plastically deformed so as to protrude in the diametrical direction and the contact portion in an engagement space. Further, the holding force for preventing removal of the pin and the link at the contact area portion can be an excellent value in terms of strength, thereby reducing material cost and a required exclusive space for the equipment. Further, since a jig which can be attached to the existing link press machine or the like can be used for the pressing jig for fixing, it is possible to fix the pin and the link without using a special press machine.

BRIEF DESCRIPTION OF THE DRAWINGS

FIGS. 7A to 7E are schematic views showing a fixing procedure between a pin and a link according to another embodiment of the present invention in which a link side is to be deformed;

FIGS. 12A to 12C are schematic views showing still another example of the fixing structure in which the link side is to be deformed and a structural example of the link with the fixing pressing jig;

FIG. 15 is a perspective view in which a conventional crawler belt is partly removed.

DESCRIPTION OF PREFERRED EMBODIMENTS

Figure 1A:
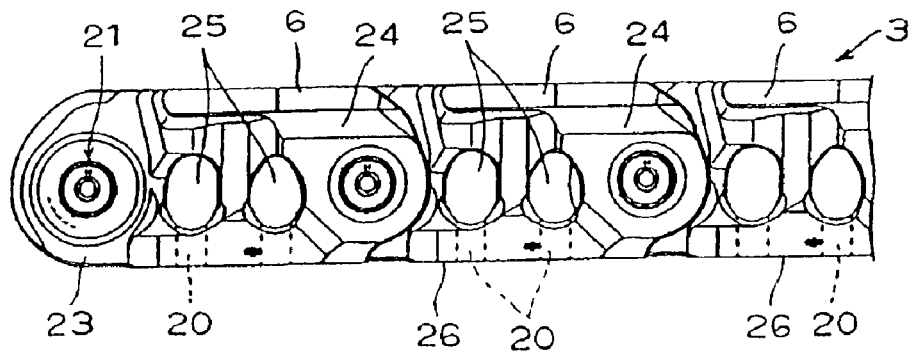
FIGS. 1A to 1C are schematic views of a structure, each showing a part of a link chain in a crawler belt according to the present invention.
Figure 1B:
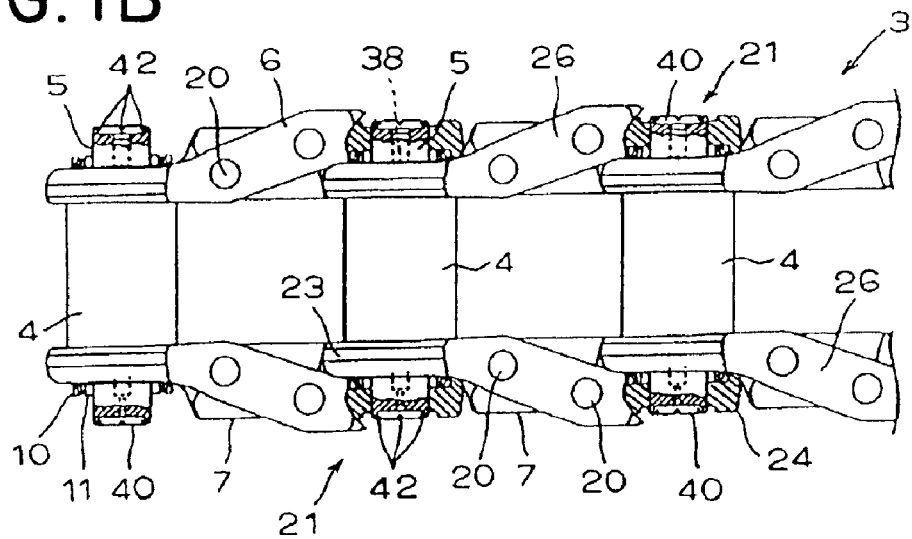
Figure 1C:
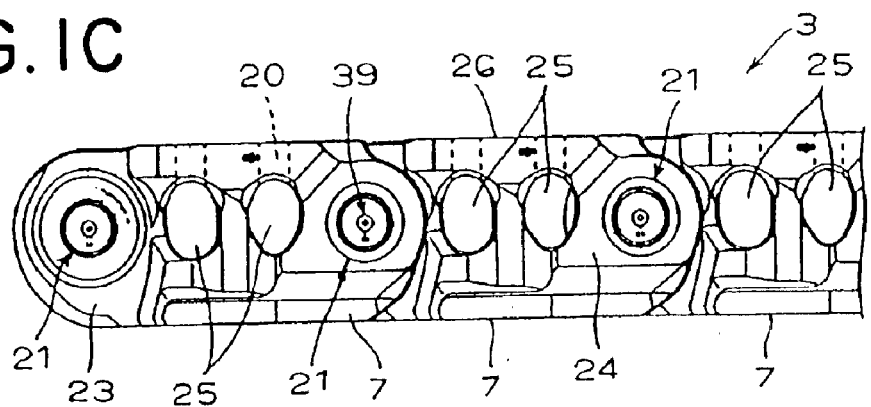

Description will be particularly given below of preferred embodiments according to the present invention with reference to the accompanying drawings. FIGS. 1A to 1C are schematic views of a structure each showing a part of a link chain in a crawler belt according to the present invention, and FIG. 2 is an exploded view showing a part of the link chain in an exploded manner.

Figure 2:
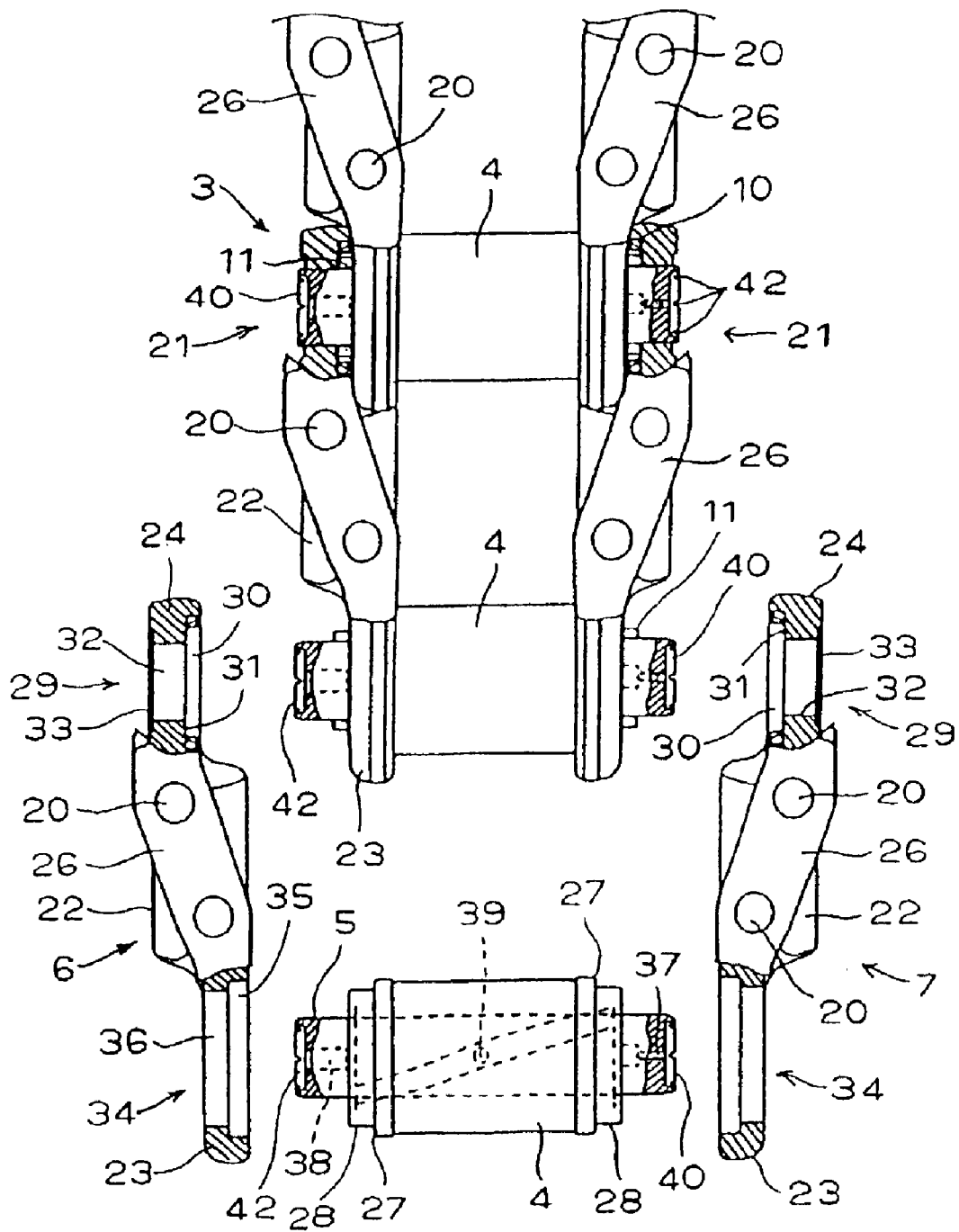
FIG. 2 is an exploded view showing a part of the link chain in an exploded manner.

In FIGS. 1 and 2, the crawler belt 1 as shown in FIG. 15 is constituted by a link chain 3 and a plurality of track blocks 2. The link chain 3 is composed of a pair of left and right plural endless links 6 and 7 connected to each other so as to form joints. The plurality of track blocks 2 as shown in FIG. 15 for contacting the ground surface are bolted to track-block-mounting holes 20 in the links 6 and 7. The crawler belt 1 is rotatably wound around travelling drive wheels which includes drive sprockets arranged in a rear portion of a track-type vehicle such as a work machine or the like (not shown), idler wheels arranged in a front portion thereof and track wheels arranged in a center portion thereof.

The link chain 3 is provided with a link assembly which is connected to a plurality of joint portions 21 so as to form joints. The link assembly has a pair of left and right links 6 and 7 which have a mirror symmetrical relation to each other, pins 5 which connect the links 6 and 7 and constitute a feature of the present invention, and cylindrical bushing 4 which are tightly fitted onto the pins 5. Each of the links 6 and 7 has end portions 23 and 24, which are inwardly and outwardly bent respectively, in both of front and rear end portions except a center portion 22. Two window portions 25 are formed at the front and rear of the center portion 22 respectively. The track-block-mounting holes 20 are formed at four positions of on flat mounting surfaces 26 which are formed in outer peripheries of the links 6 and 7, namely at front, rear, right and left portions. The track-block-mounting holes 20 are communicated with the window portions 25. A length of the pin 5 as mentioned above is set to be substantially equal to an outer width between the left and right links 6 and 7. As shown in FIG. 2, the bushing 4 has bushing engagement portions 28 for press-fitting of the links 6, 7, which are formed in outer peripheral edges of both ends of the bushing 4 via steps 27.

One end portion 24 of each of the left and right links 6 and 7, which is outwardly bent, is a pin-press-fitting end portion for connecting to the pin 5. The pin-press-fitting end portion 24 is formed with a pin-press-fitting hole 32 for press-fitting each of opposite end portions of the pin 5. The other end portion 23 of each of the left and right links 6 and 7, which is inwardly bent, constitutes a bushing-press-fitting end portion for press-fitting and fixing the bushing engagement portion 28. The bushing-press-fitting end portion 23 is formed with a bushing-press-fitting hole 36 for press-fitting the bushing 4. The dimension of the pin-press-fitting end portion 24 in a longitudinal direction thereof is shorter than that of the bushing-press-fitting end portion 23 in the same direction. The leading end of each of the pair of end portions 23 and 24 is formed in a substantially semicircular shape.

Each of the pin-press-fitting holes 29 into which the pin 5 is press-fitted has a fitting hole 30, to which a seal member 10 for sealing lubricating oil stored in an inner portion of the pin 5 and a spacer 11 for preventing the seal member 10 from collapsing are concentrically fitted and attached, a pin fitting hole 32, which is formed in the fitting hole 30 via an engagement step portion 31 for the seal member and for engaging the spacer and has a smaller diameter than the fitting hole 30, and a pin-end-portion-engaging hole 33, which has a larger diameter than the pin fitting hole 32. The fitting hole 30, the pin fitting hole 32 and the pin-end-portion-engaging hole 33 are continuously formed. The bushing-press-fitting hole 34 formed in the bushing-press-fitting end portion 23 of the links 6 and 7 has an engagement hole 35 which engages the bushing 4, and an engagement hole 36 for the bushing engagement portion 28 which has a smaller diameter than the engagement hole 35.

An oil injecting hole 37 which injects the lubricating oil is formed in an axial center of an end of the pin 5. Further, a lubricating oil storage portion 38 which is communicated with the oil injection hole 37 is formed on the axial center of the pin 5. The lubricating oil storage portion 38 and an outer peripheral surface of the pin 5 are communicated with each other via a branch hole or an oil hole 39 so that the lubricating oil can be supplied to an inner peripheral surface of the bushing. The oil injecting hole 37 is sealed by a lubricating oil sealing plug (not shown).

FIGS. 3 to 6 show a fixing structure between the link and the pin in the crawler belt according to the present invention in which the fixing end surface of the pin is pressed in the axial direction and the a protruding portion is formed by plastic deformation.

Figure 3A:
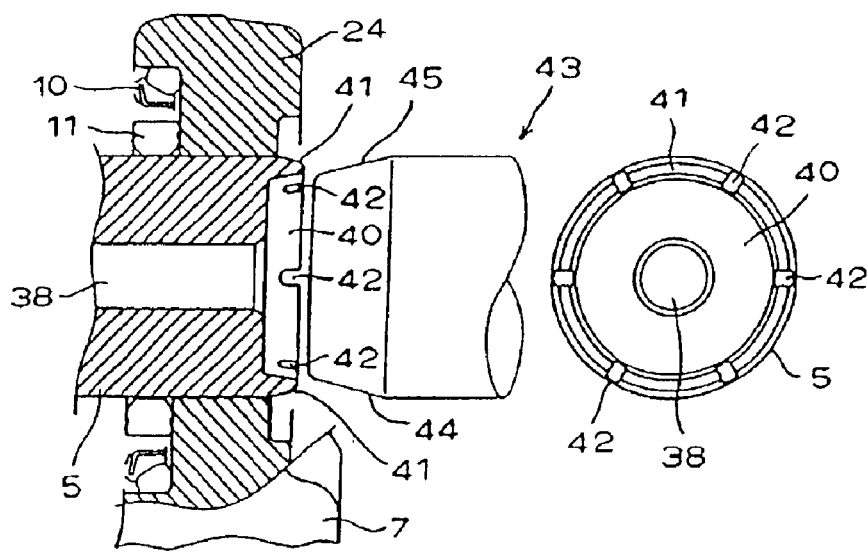
FIGS. 3A and 3B are schematic views, each showing a structural example of a pin and a pressing jig for fixing according to the present invention.
Figure 3C:
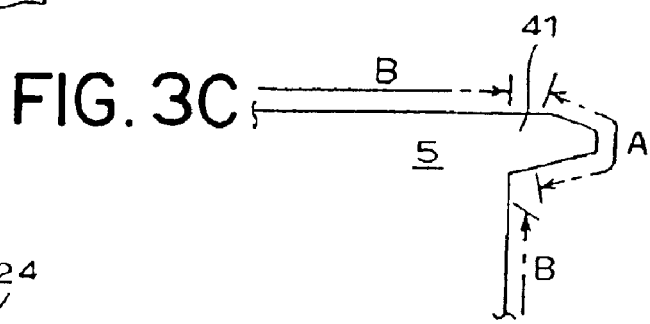
Figure 3B:
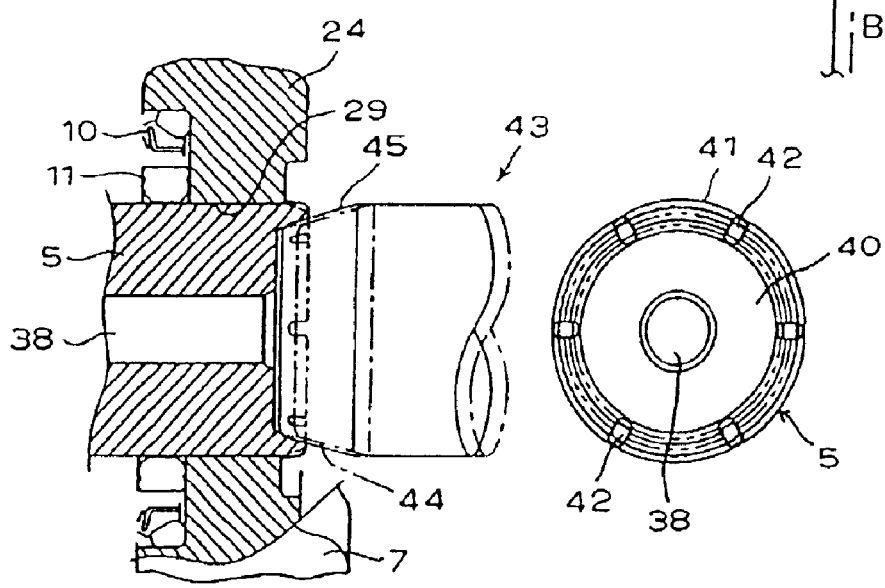

FIGS. 3A and 3B show a first example of the fixing structure constituted by the pin 5 and a fixing push jig 43. As shown in FIGS. 3A and 3B, at least one end portion of the pin 5 is formed with a taper surface in an outer peripheral surface thereof. The taper surface has a leading end which is smaller in diameter at an angle of about 10 degrees. A recessed portion 40 is formed in a center portion of an end surface of the pin end portion. The recessed portion 40 is formed in a taper shape which is reduced in diameter toward a bottom portion thereof, and is communicated with the lubricating oil storage portion 38 which is sealed by the lubricating oil sealing plug (not shown). According to the present invention, a horizontal cross section of the recessed portion 40 is optional. It may be a circular shape, a polygonal shape or the like. It is desirable that an opening peripheral edge portion 41 of the recessed portion 40 is formed in such a shape that is easily deformed at the time when the pin 5 is pressed in the axial direction. For example, a plurality of notches 42 which extend in radial directions with a predetermined phase difference in a peripheral direction of the opening peripheral edge portion 41. The phase difference may be 60 degrees as shown in the illustrated embodiment.

The opening peripheral edge portion 41 of the recessed portion 40 is pressured from its inner side by the fixing push jig 43 having a taper surface, whereby the portions adjacent to the notches 42 are plastically deformed in a diameter expanding direction toward the peripheral surface of the pin-press-fitting hole 29 of each of the links 6 and 7. Thus, the peripheral edge portion 41 is fixed along the periphery of the pin-press-fitting hole 29 in each of the links 6 and 7. That is, when the fixing push jig 43 is pressed in the axial direction of the recessed portion 40 of the pin end surface by means of the operation of an existing link press machine or the like (not shown), a pressing portion 44 as a taper surface of the fixing push jig 43 presses an inner wall surface of the opening peripheral edge portion 41 of the pin recessed portion 40 as shown in FIG. 3B. As a result, the protruding portions existing between the respective notches 42 of the pin 5 are plastically deformed while being expanded in the radial direction, so that the opening peripheral edge portion 41 of the pin 5 is fixed along the opening peripheral portion of the pin-press-fitting hole 29 of each of the links 6, 7.

At this time, as shown in FIG. 3C which illustrates the opening peripheral edge portion 41 in a partly enlarged view, a surface hardness of a partial surface A of the opening peripheral edge portion 41 of the pin 5, which is to be annealed, is made lower than a surface hardness of a surface B of a non-plastically deformed portion. Medium carbon alloy steel is employed for the pin 5. The surface hardness of the pin 5 is made to be HRC 53 to 63 by tempering, and the hardening depth is set to be about 3 to 8 mm. The surface hardness of the annealed partial surface A of the leading end portion of the opening peripheral edge portion 41 is set to be HRC 25 to 40. In this case, the hardness of a center portion of the pin 5 is set to be about HRC 20 to 35.

Accordingly, the pin 5 can secure a sufficient surface hardness which is necessary for the pin, and it is possible to easily form the protruding portions by the plastic deformation by means of the fixing push jig. Further, since the plastically deformed portions exist all around the peripheral edge of the opening peripheral edge portion 41 except the notches, a sufficient holding force in the axial direction can be secured between the pin 5 and the link 6, 7, which are not rattled even against an impact applied from the outside.

The annealing of the leading end portion of the opening peripheral edge portion 41 can be performed by heating with a heating means, which is capable of heating only a required portion, such as an induction heating and thereafter slowly cooling. The surface hardness of the plastically deformed portion can be set to an optimum hardness by adjusting the heating time, heating temperature or the like of the heating means. In this case, medium carbon alloy steel is used for the pin 5, however, the other metal can be used as far as the material of the metal can satisfy characteristics, such as strength, abrasion resistance or the like, of the pin 5 in the crawler belt. In this case, if the surface hardness of the plastically deformed portion is set to be lower than the surface hardness of the other portions of the pin, the hardness should not be limited to the hardness as mentioned above.

Further, since the surface hardness of the plastically deformed portion is set to be low, it is possible to prevent brittle fracture. Further, it is possible to firmly connect and fix between the link 6, 7 and the pin 5 in a stable manner.

Figure 4A:
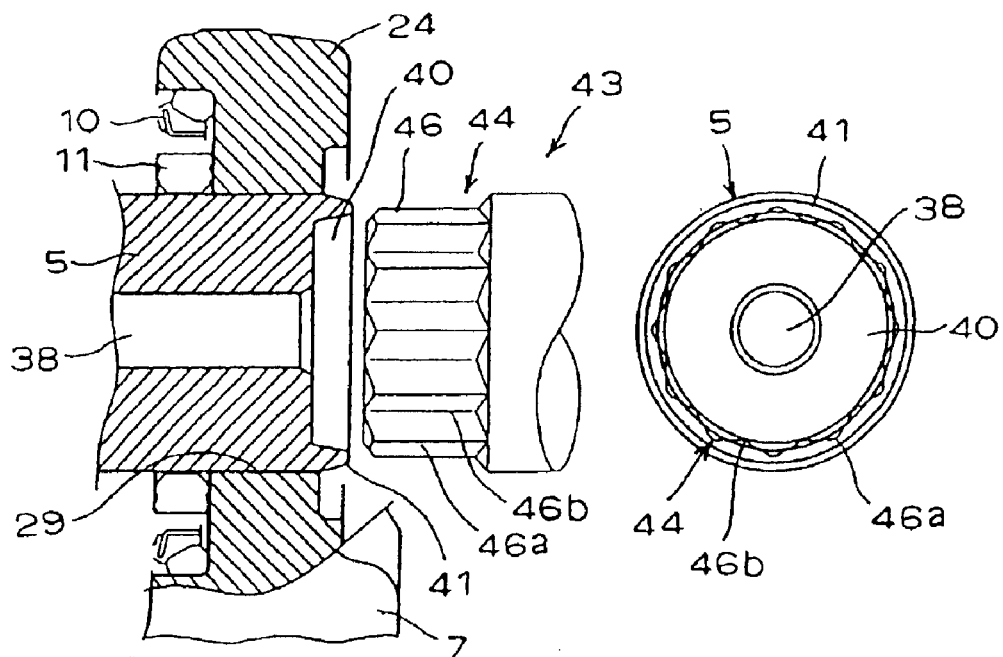
FIGS. 4A and 4B are schematic views, each showing another structural example of the pin and the pressing jig for fixing according to the present invention.
Figure 4B:
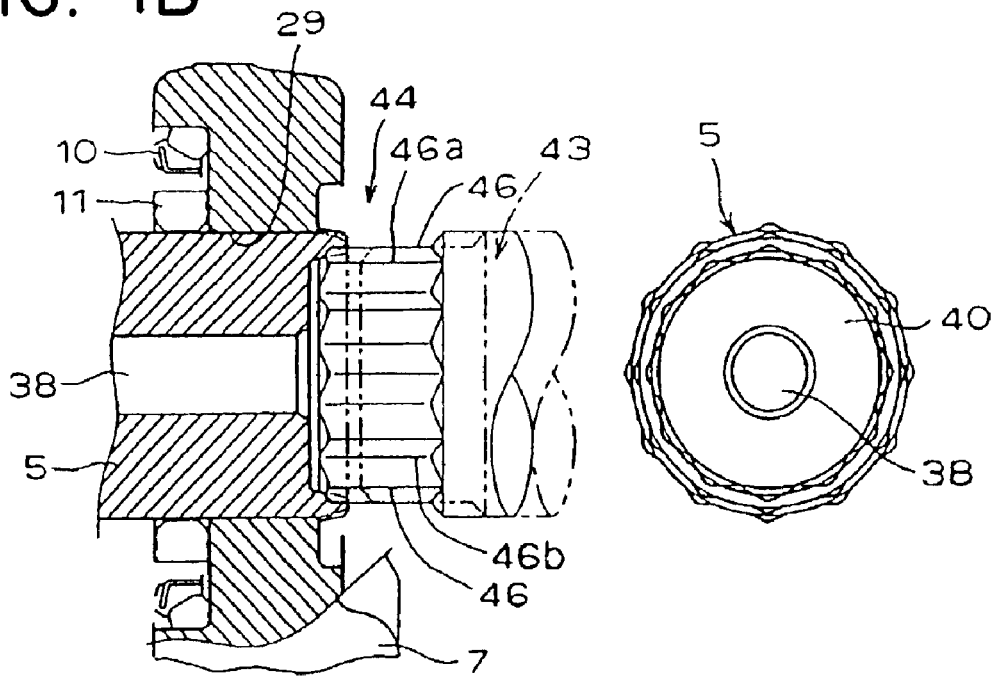

FIGS. 4A and 4B show a second example of the fixing structure in which the pin 5 and the link 6, 7 are fixed by using a wave-shaped pressing portion 44, which is formed in a zigzag shape on a peripheral surface of a leading end portion of the fixing push jig 43 in a circumferential direction, with respect to a recessed portion 40 having a ring-like opening peripheral edge portion 41 formed in the pin end surface. An outer diameter of a convex portion 46a of the pressing portion 44 having a circumferential surface formed in the wave shape is set to be larger than an inner diameter of an opening of the recessed portion 40 in the pin 5. An outer diameter of a recess portion 46b of the pressing portion 44 is set to be substantially the same as an inner diameter of a bottom portion of the recessed portion 40. Accordingly, when the fixing push jig 43 is being pressed into a center portion of the pin recessed portion 40 by the operation of an existing link press machine (not shown), the convex portion 46a of the pressing portion 44 of the fixing push jig 43 presses and deforms the inner peripheral surface of the opening peripheral edge portion 41 in the pin recessed portion 40 as shown in FIG. 4B, so that the opening peripheral edge portion 41 is pushed and expanded in the radial direction in a substantially wave shape and is fixed along an opening periphery of the pin-press-fitting hole 29 of the link 7. In this case also, in the same manner as shown in FIG. 3C illustrating a partly enlarged view of the opening peripheral edge portion 41, the surface hardness of at least the partial surface A, which corresponds to the plastic deformation in the leading end portion of the opening peripheral edge portion 41 in the pin 5, is set to be lower than the surface hardness of the surface B of the non-plastically deformed portion by means of annealing. The middle carbon alloy steel is used for the pin 5, and the surface hardness thereof is set to be HRC 53 to 63 by means of hardening. Further, the hardening depth is set to be about 3 to 8 mm, and the surface hardness of the annealed partial surface A in the leading end portion of the opening peripheral edge portion 41 is set to be HRC 25 to 40. In this case, the hardness of a center portion of the pin 5 is set to be about HRC 25 to 35.

In comparison with the first example of the fixing structure as mentioned above, since the pressing force is dispersed so that the opening portion peripheral edge 41 of the recessed portion 40 is locally deformed at a plurality of portions in all the periphery thereof, it is possible to effectively deform with a small press force.

Figure 5A:
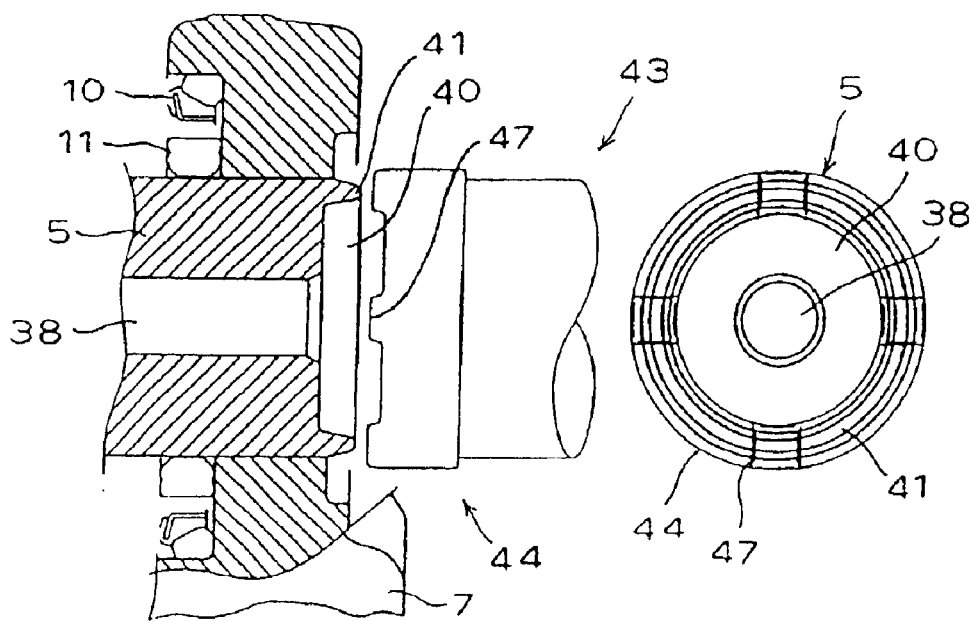
FIGS. 5A and 5B are schematic views, each showing still another structural example of the pin and the pressing jig for fixing according to the present invention.
Figure 5B:
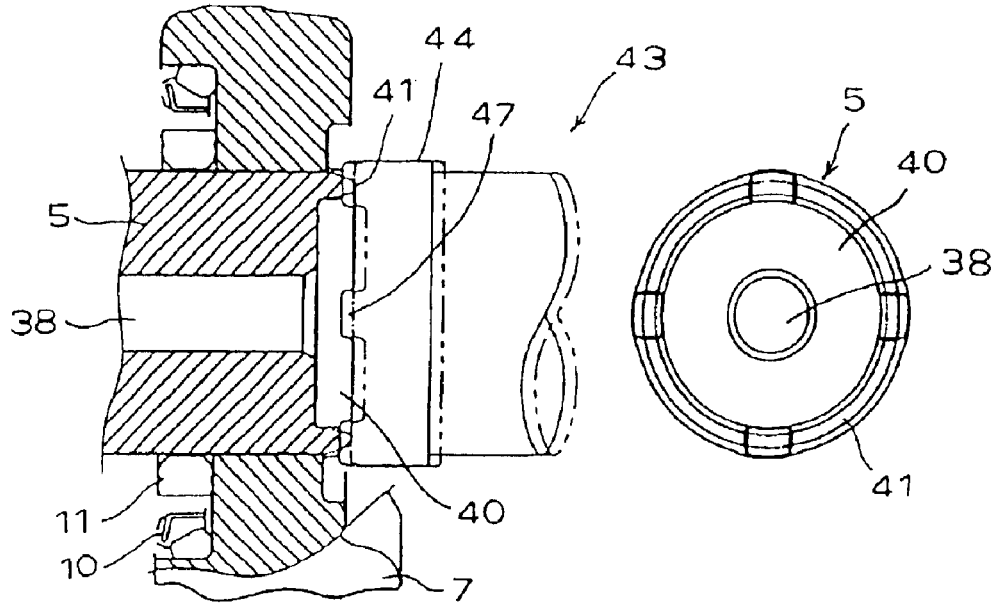

A third example of the fixing structure shown in FIGS. 5A and 5B employs a fixing push jig 43 having a pressing portion 44 in which four protruding portions 47 are provided in an axial direction of the leasing end of the fixing push jig 43 with a uniform interval at an angle of 90 degrees, with respect to the recessed portion 40 having a ring-like opening peripheral edge portion 41 which is formed in a pin end surface in the same manner as the second example of the fixing structure shown in FIGS. 4A and 4B. An outer diameter of the pressing portion 44 is formed to be larger than an outer diameter of the pin 5, and a diametrical dimension of the protruding portions 47 in the pressing portion 44 is set to be larger than that of the opening peripheral edge portion 41 of the recessed portion 40 in the pin end portion.

Accordingly, when the fixing push jig 43 is pressed toward a center of the pin recessed portion 40 by means of the operation of an existing link press (not shown), a plurality of protruding portions 47 of the fixing push jig 43 presses the opening peripheral edge portion 41 of the recessed portion 40 of the pin 5 in the axial direction as shown in FIG. 5B, intermittently collapses the opening peripheral edge portion 41 of the pin 5, and pushes and expands the opening peripheral edge portion 41 in the radial direction of the pin 5 so as to fix the pin end portion along the opening periphery of the pin-press-fitting hole 29 of the link 7. In this case also, in the same manner as shown in FIG. 3C illustrating a partly enlarged view of the opening peripheral edge portion 41, the surface hardness of at least the partial surface A, which is plastically deformed, in the leading end portion of the opening peripheral edge portion 41 of the pin 5 is set to be lower than the surface hardness of the surface B of the non-plastically deformed portion by means of annealing. Middle carbon alloy steel is used for the pin 5, and the surface hardness thereof is set to be HRC 53 to 63 by means of hardening. Further, the hardening depth is set to be about 3 to 8 mm, and the surface hardness of the annealed partial surface A in the leading end portion of the opening peripheral edge portion 41 is set to be HRC 25 to 40. In this case, the hardness of a center portion of the pin 5 is set to be about HRC 25 to 35.

In comparison with the second example of the fixing structure as mentioned above, since the press force generated by the press machine is directly applied to the pin end surface, it is possible to plastically deform the opening peripheral edge portion 41 of the pin 5 by a smaller press force in the axial direction of the pin 5.

Figure 6A:
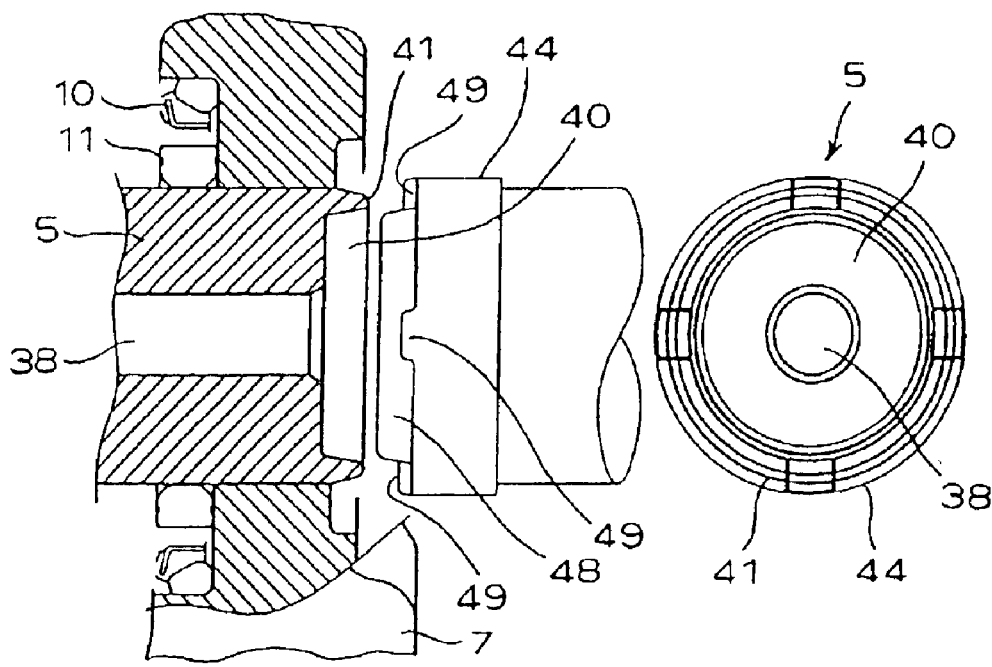
FIGS. 6A and 6B are schematic views, each showing still another structural example of the pin and the pressing jig for fixing according to the present invention.
Figure 6B:
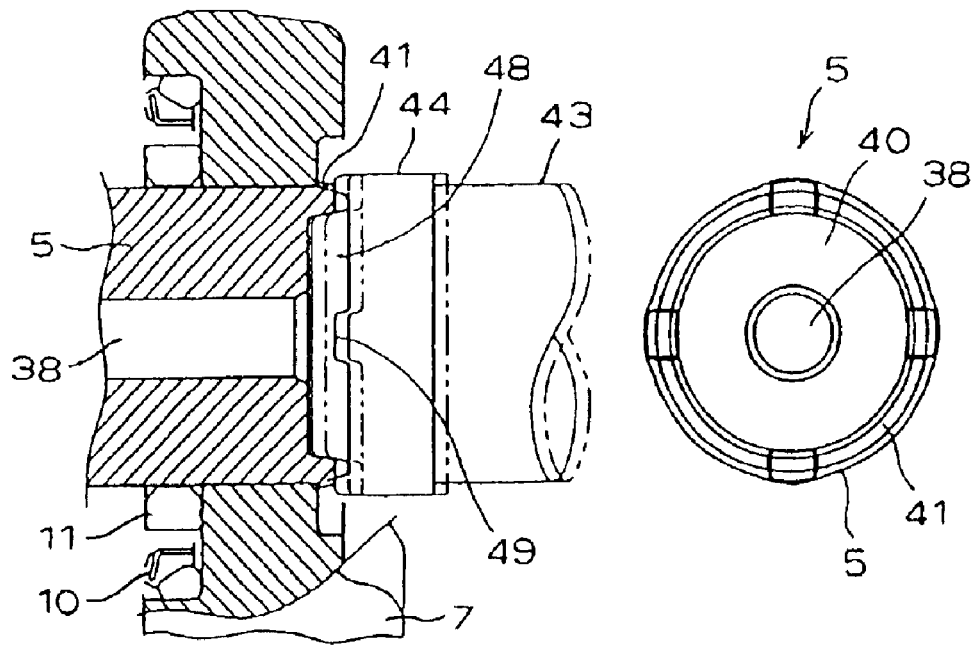

A fourth example of the fixing structure shown in FIGS. 6A and 6B has a first pressing portion 48 having a tapered shape in which the leading end portion of the fixing push jig 43 is protruded along the center thereof, and second pressing portions 49 which are provided in an outer peripheral portion of a base end of the first pressing portion 48 with a phase difference of 90 degrees, with respect to the pin end portion having a recessed portion 40 which is formed in the same shape as the second and third examples of the fixing structure mentioned above. The taper surface of the first pressing portion 48 has an inclined surface which is substantially equal to an angle of inclination of the inner peripheral surface of the recessed portion 40. An outer diameter of the second pressing portions 49 is set to be larger than an outer diameter of the pin 5. The second pressing portions 49 push and collapse the opening peripheral edge portion 41 of the recessed portion 40 in the pin axial direction so as to expand and deform the opening peripheral edge portion 41 in the radial direction while restricting deformation of the opening peripheral edge portion 41 in the inner diameter direction by the taper surface of the first pressing portion 48.

Accordingly, when the fixing push jig 43 is pressed toward a center of the pin recessed portion 40 by means of the operation of an existing link press (not shown), the first pressing portion 48 of the fixing push jig 43 is pressed toward a bottom surface of the recessed portion 40 while being in slidable contact with the inner peripheral surface of the recessed portion 40 of the pin 5 as shown in FIG. 6B. At the same time, the second pressing portion 49 collapses the opening peripheral edge portion 41 of the pin 5 in the axial direction, pushes and expands the opening peripheral edge portion 41 in the radial direction of the pin 5, and then fixes the pin end portion along the opening peripheral portion of the pin-press-fitting hole 29 of the link 7. In this case also, in the same manner as shown in FIG. 3C illustrating a partly enlarged view of the opening peripheral edge portion 41, the surface hardness of the partial surface A, which is plastically deformed, in the leading end portion of the opening peripheral edge portion 41 of the pin 5 is set to be lower than the surface hardness of the surface B of the non-plastically deformed portion by means of annealing. Middle carbon alloy steel is used for the pin 5, and the surface hardness thereof is set to be HRC 53 to 63 by means of hardening. Further, the hardening depth is set to be about 3 to 8 mm, and the surface hardness of the annealed partial surface A in the leading end portion of the opening peripheral edge portion 41 is set to HRC 25 to 40. In this case, the hardness of the center portion of the pin 5 is set to be about HRC 25 to 35. Since the opening peripheral edge portion 41 is pushed and collapsed in the axial direction of the pin 5 by the second pressing portions 49 while the opening peripheral edge portion 41 is prevented from being deformed in the inner diameter direction by the taper surface of the first pressing portion 48, it is possible to securely deform the opening peripheral edge portion 41 in the outer diameter direction. Furthermore, a holding force in the axial direction of the pin can be securely and sufficiently applied.

Meanwhile, when the fixing structure between the pin 5 and the links 6 and 7 according to the present invention mentioned above is applied for assembling the pin 5 and the links 6 and 7, the pin 5 is inserted into the bushing 4 in advance in a state that both ends of the pin 5 are exposed to the outside in the present embodiment, which forms a pin and bushing assembly. The pin and bushing assembly, the pin-press-fitting holes 29 and the bushing-press-fitting holes 34 of the links 6 and 7 are concentrically arranged, and the pin and bushing assembly is set between a left press-fitting jig and a right press-fitting jig of an existing link press machine (not shown). Next, the left press-fitting jig and the right press-fitting jig are operated. Then, each of the bushing-press-fitting holes in a first set of right and left master links (half links only on the bushing side) (not shown) is pressed and fitted onto the bushing 4 of the pin and bushing assembly. At this time, the pin 5 of the pin and bushing assembly is exposed to the outside from each of the bushing-press-fitting holes 34 in the right and left master links. Accordingly, the first set of right and left master links is fed out and the next pin and bushing assembly is set by the same operation as mentioned above.

Next, in a state that the track block mounting surface 26 formed in the links 6 and 7 is set on an upper side, the right link 7 in the next order in which the seal member 10 for lubricating oil is previously fitted and attached to the fitting hole 30 of the pin-press-fitting hole 29 is set to the right press-fitting jig of the link press machine. Then, a spacer 11 for preventing the enclosed seal member from collapsing is fitted onto the end portion of the pin which protrudes from the right master link in the first set. After that, the left press-fitting jig of the link press machine is operated, and the left press-fitting jig is pressed with respect to the right press-fitting jig. As a result, the end portion of the pin 5 which is exposed to the outside from the bushing-press-fitting hole 34 of the right master link is press-fitted into the pin-press-fitting hole 29 of the right link 7 in the next order. At the same time, the bushing 4 of the pin and bushing assembly in the next order is press-fitted into the bushing-press-fitting hole 34 of the right link 7 in the next order. At this time, the pin end portion of the pin and bushing assembly in the next order is exposed to the outside from the bushing-press-fitting hole 34 of the right link 7 in the next order.

Next, the left link 6 in the next order, to which the seal member 10 is mounted, is set to the left press-fitting jig, by means of the same operation as the above-mentioned press-fitting operation of the right link 7 in the next order. Then, after the spacer 11 is mounted to the pin 5 of the left master link in the first set in the same manner as mentioned above, the right press-fitting jig is operated. Then by pressing the right press-fitting jig with respect to the left press-fitting jig, the end portion of the pin 5, which is exposed to the outside from the bushing-press-fitting hole 34 in the left master link, is press-fitted into the pin-press-fitting hole 29 of the left link 6 in the next order. At the same time, the bushing of the pin and bushing assembly in the next order is press-fitted into the bushing-press-fitting hole 34 of the left link 6 in the next order. At this time, the pin end portion of the pin and bushing assembly in the next order is exposed to the outside from the bushing-press-fitting hole 34 of the left link 6 in the next order. Accordingly, the assembly of the left and right links 6 and 7 in the second set is finished.

The assembling operation as mentioned above is repeated sequentially until a predetermined assembling number of the left and right links 6 and 7 is achieved. Thereafter the pin-press-fitting holes of the left and right master links (the half links only on the pin side) (not shown) which are the final links are pressed and fitted to the end portions of the pin which are exposed to the outside from the bushing-press-fitting holes 34 in the left and right links 6 and 7 in the previous order. In the manner as mentioned above, the final links are assembled in the right and left master links, so that the press-fitting operation between all of the pins and links is finished. Thus, the link chain is manufactured.

Next, a fixing method between the link and the pin in the crawler belt according to the present invention is executed in the following manner. In the present embodiment, when the pin 5 is fixed to the links 6 and 7, the pin and links are previously hardened so as to obtain desired surface hardness and hardening depth. The portion A which corresponds to the plastic deformation in the opening peripheral edge portion of the pin, that is, at least a range from the periphery of the portion exposed to the pressing to the protruding portion formed by the plastic deformation is further annealed after being hardened in the manner mentioned above.

Further, in the present embodiment, description will be given of a case of fixing the pin 5 to the links 6 and 7 according to the present invention after a plurality of pin and bushing assemblies are pressed and fitted into the respective links 6 and 7 so as to assemble the link chain in the manner mentioned above, at the time when the pin 5 is fixed to the links 6 and 7. However, according to the present invention, it is possible to execute the fixing method between the pin 5 and the links 6 and 7 continuously after the respective pin and bushing assemblies are pressed and fitted into two sets of left and right links 6 and 7 in the successive positions.

Then, after the press-fitting operation mentioned above has been finished, the operation goes to the fixing operation between the link and the pin in the crawler belt according to the present invention. First, the right press-fitting jig provided in the leading end of the link press machine is taken out, and the fixing push jig 43 according to the present invention is mounted. Next, the pin 5 of the right link 7 is positioned on the same axis as the fixing push jig 43 and fixed between the left press-fitting jig of the link press machine and the fixing push jig 43 in the right side. The fixing push jig 43 is operated by the link press machine, the fixing push jig 43 is pressed into the recessed portion 40 which is formed in the right end surface of the pin 5 while the left press-fitting jig is set at the receiving side so that the fixing push jig 43 is pressed in the axial direction of the pin 5. As a result, the opening peripheral edge portion 41 of the recessed portion 40 is expanded along the periphery of the opening of the pin-press-fitting hole 29 in the right link 7.

Next, after the fixing operation mentioned above has been finished, the pin 5 of the right link 7 in the previous order is fed out, and the fixing operation of the pin 5 with the right link 7 in the next order is performed in the same manner. At this time, for example, a previously set control date such as a target data is compared with a pressing force of the pin 5 in the axial direction which is actually detected. If the detected value is within a threshold value, the link press machine is controlled so as to be automatically stopped by a control apparatus (not shown)

Thus, according to the present invention, at least one end surface of the pin 5 is expanded along the peripheral portion of the opening of the pin-press-fitting hole 29 and the right link 7 is fixed to the end portion of the pin 5 as described with reference to FIGS. 3 to 6. The fixing operation is sequentially repeated for every link, and the fixing operation between the right link 7 and the pin 5 is finished. Accordingly, the link chain 3 is completed.

After the link chain 3 is completed, lubricating oil is injected into the lubricating oil storage portion 38 from the oil injection hole 37 in each of the pins 5, and the lubricating oil is sealed by closing the oil injection hole 37 with the lubricating oil sealing plug. Next, the track blocks 2 are respectively mounted to the link chain 3 via the track-block-mounting holes 20 of the links 6 and 7 with the mounting bolts (not shown) or the like by using a track-block-mounting impact wrench (not shown) or the like. As a result, the crawler belt 1 is completed.

As is apparent from the above description, according to the fixing method of the crawler belt, the link and the pin of the crawler belt in the embodiments as mentioned above, since the surface hardness of the portion which corresponds to the plastic deformation is set to be lower than the surface hardness of the other portions, it is possible to easily and integrally expand the end portion of the pin all around the outer peripheral surface thereof. Further, since it is possible to increase the width, the thickness and the like of the expanded portion of the outer peripheral surface, it is possible to accurately and sufficiently apply the holding force with respect to the axial direction of the pin. Further, since the pin is fixed to the link at all the peripheral edge of the pin, the holding force in the axial direction of the pin becomes strong, so that it is possible to completely prevent the pin from moving in the axial direction even if impact is applied from the outside.

Accordingly, even when each of the links is subject to the external force in the axial direction or the like which is applied by a flange portion of the lower roller, a roller guard and the like in a vehicle body, it is possible to prevent the seal member for lubricating oil in each of the links and the spacer for prevention of collapsing the seal member from being deformed, damaged or the like. Therefore, it is possible to sufficiently secure durability for the link chain.

Further, at the time of assembling the pin and the link, not only it is possible to prevent the pin from being damaged or the like when the end portion of the pin is being plastically worked, but also the end surface portion of the pin is pressed and deformed in the pin axial direction which is the same as the fit-pressing direction of the link into the pin, so that the link and the pin in the crawler belt can be fixed only by replacing a pressing jig provided at the leading end of the existing press machine with the fixing push jig according to the present invention.

In the fixing method between the link and the pin in the crawler belt according to the embodiment mentioned above, more accurate fixing can be achieved by controlling the pressing force of the fixing push jig by means of the control apparatus in correspondence to the pin shape, the leading end shape of the fixing push jig or the like.

FIGS. 7 to 11 show typical examples of the fixing structure and the fixing method thereof according to the present invention in which the plastic deformation by the pressing as mentioned above is performed on the link side. In addition, in the following description, the same reference numerals are given to the members having substantially the same structures as those of the embodiments mentioned above.

Figure 8:
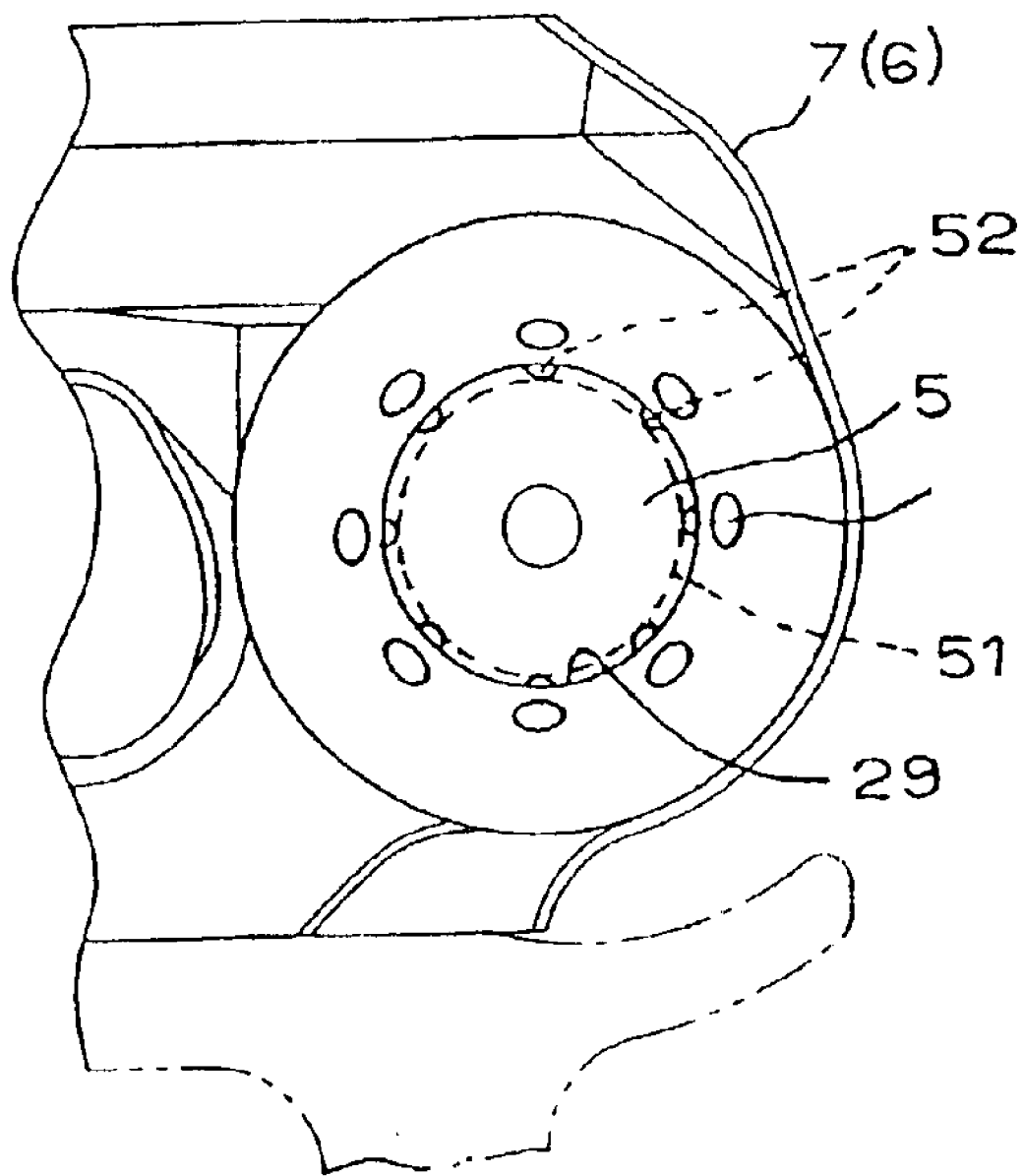
FIG. 8 is a front view showing a fixing end surface of the pin and the link which have been fixed in accordance with said fixing procedure.

According to the example of the fixing structure between the pin 5 and the right link 7 and the fixing method which are shown in FIGS. 7 and 8, a ring-like engagement groove 51 is formed on a peripheral surface of the press-fitting end portion of the pin 5. After the pin end portion is press-fitted into the pin-press-fitting hole 29 of the right link 7, the peripheral edge portion of the end surface opening of the pin-press-fitting hole 29 is locally pressed by the fixing push jig 43 in the axial direction of the pin 5. The peripheral edge portion, is pressed on the same circumference thereof at desired intervals. The fixing push jig 43 in this case has a larger diameter than the outer diameter of the pin 5, and a plurality of projections, each of which has an oval cross sectional shape, are formed on one end surface of the fixing push jig 43 along an outer periphery thereof with a predetermined phase difference (30 degrees in the illustrated embodiment).

The fixing push jig 43 is mounted to a press machine (not shown) for assembling a crawler belt, and then pressing operation mentioned above is performed by the press machine.

When the opening peripheral edge portion of the pin-press-fitting hole 29 in the right link 7 is pressed by the fixing push jig 43 so that the peripheral edge portion is locally deformed, a part of an inner peripheral surface of the pin-press-fitting hole 29 in the link 7, which is to oppose to the engagement groove 51 of the pin 5, locally protrudes into the engagement groove 51 so as to be fitted to and engaged with the engagement groove 51. As shown in FIG. 7E, by means of annealing, the surface hardness of the opening peripheral edge portion at this time is formed to be HRC 25 to 40, and the surface hardness of the other portions of the link are on the other hand formed to be HRC 30 to 45.

In addition, the size, the shape or the number of the projections 52 can be optionally changed in correspondence to a required shearing force.

Figure 9:
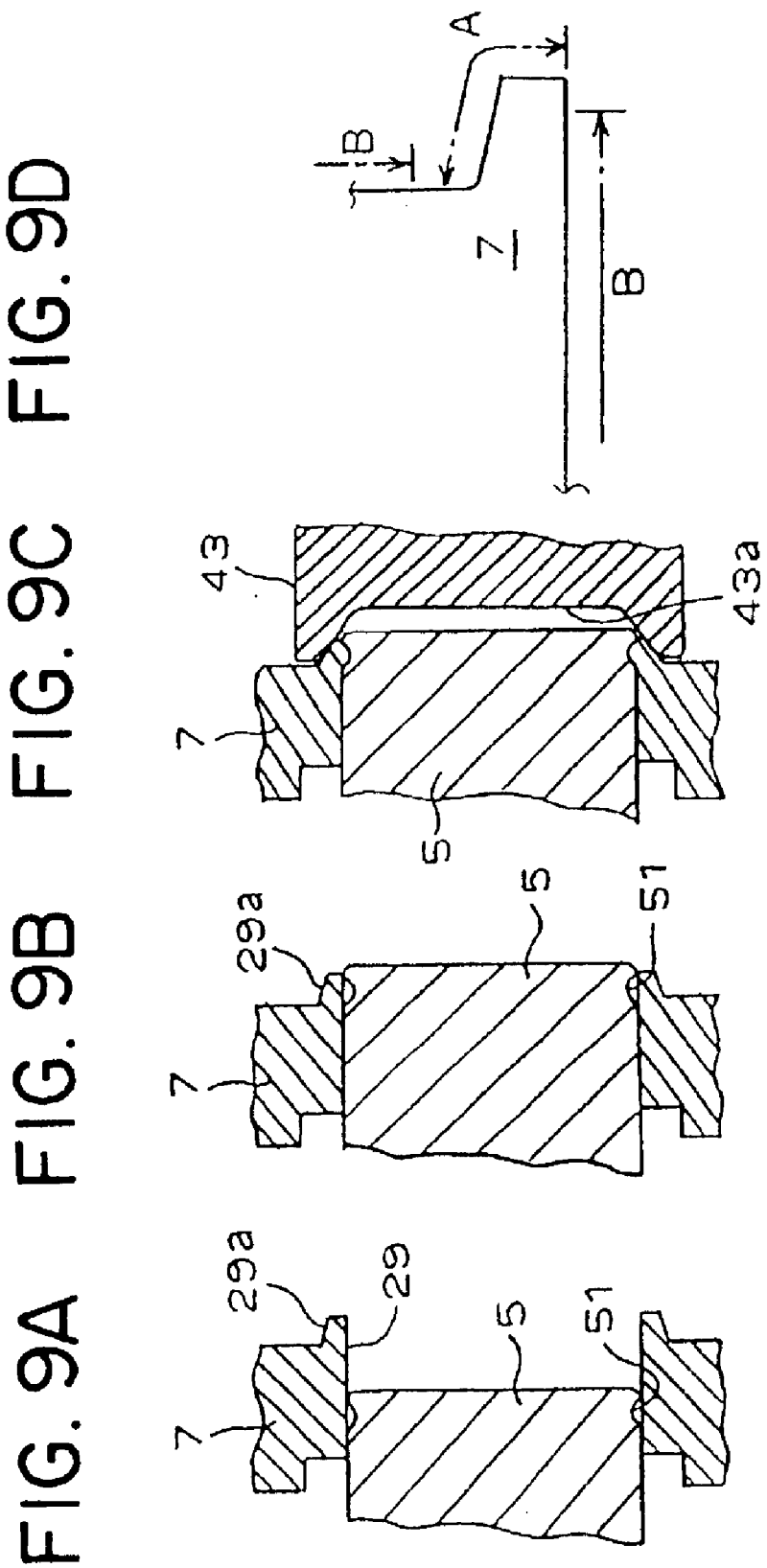
FIGS. 9A to 9D are vertical cross sectional views each showing a fixing end surface of a pin and a link according to another embodiment of the present invention in which a link side is to be deformed.
Figure 10:
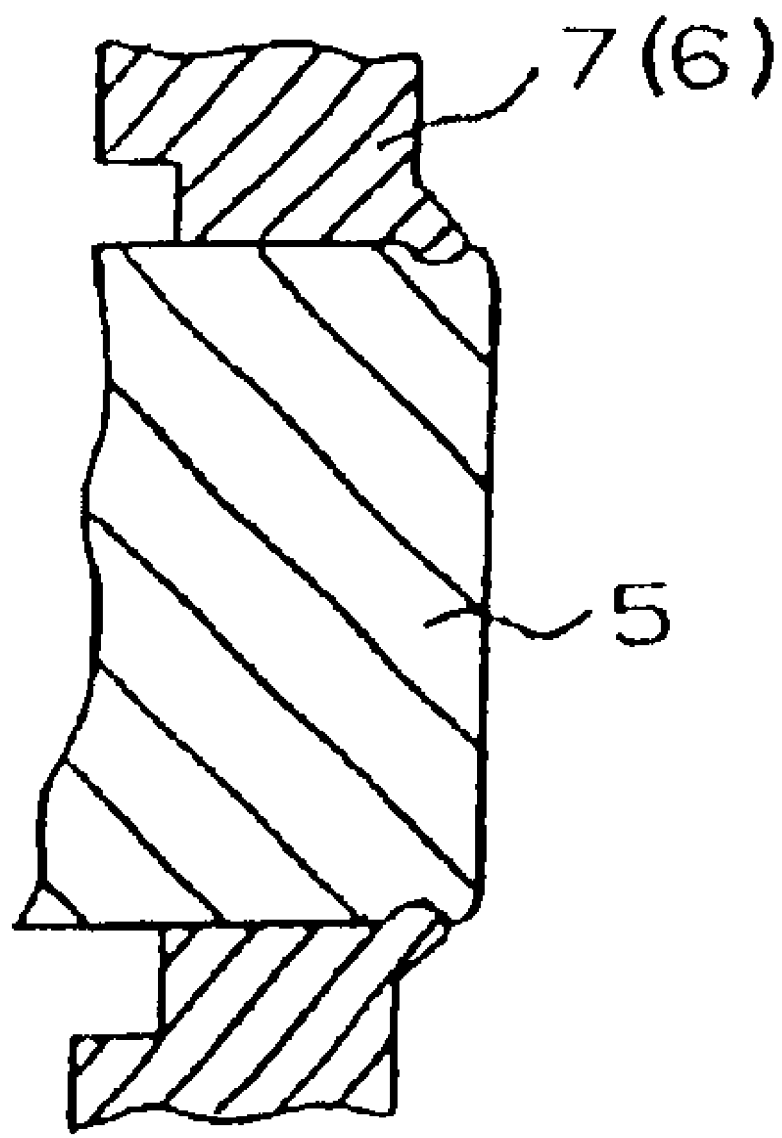
FIG. 10 is a schematic view showing a fixing procedure between the pin and the link according to the last-mentioned embodiment.

FIGS. 9 and 10 show a sixth example of the fixing structure and a fixing procedure thereof according to the present invention. A ring-like engagement groove 51 is continuously formed on a peripheral surface of the press-fitting end portion of the pin 5. Further, a plurality of protruding pieces 29a are intermittently provided in the periphery of the opening end of the pin-press-fitting hole 29 in the link 7 so as to protrude in a horizontal manner. When the press-fitting end portion of the pin 5 is press-fitted into the pin-press-fitting hole 29 of the right link 7 and the protruding pieces 29a are positioned on the engagement groove 51 as shown in FIG. 10B, the fixing push jig 43 is pressed along the center line of the pin 5. The fixing push jig 43 in this case has a larger diameter than the outer diameter of the protruding pieces 29a of the right link 7 and has a pressing end which is formed with a recessed portion 43a having an inner peripheral surface tapered to an inner side thereof.

When the link end surface on an outer diameter side of the protruding pieces 29a is continuously or intermittently pressed on the same circumference thereof by the fixing push jig 43, the protruding piece 29a is pressed by an inner peripheral surface of the fixing push jig 43 so as to be bent and deformed to the inner diameter side thereof. As a result, the protruding piece 29a is fitted into the engagement groove 51 which is formed at the end portion of the pin 5 as shown in FIG. 9C so as to be engaged with and fixed to the engagement groove 51. At this time, as shown in FIG. 9D, the surface hardness of a partial surface A in the opening peripheral edge portion, which is plastically deformed, is formed to be HRC 25 to 40 by means of annealing, and the surface hardness of a surface B of a non-plastically deformed portion of the link 7 is formed to be HRC 30 to 45 by means of hardening.

Figure 11A:
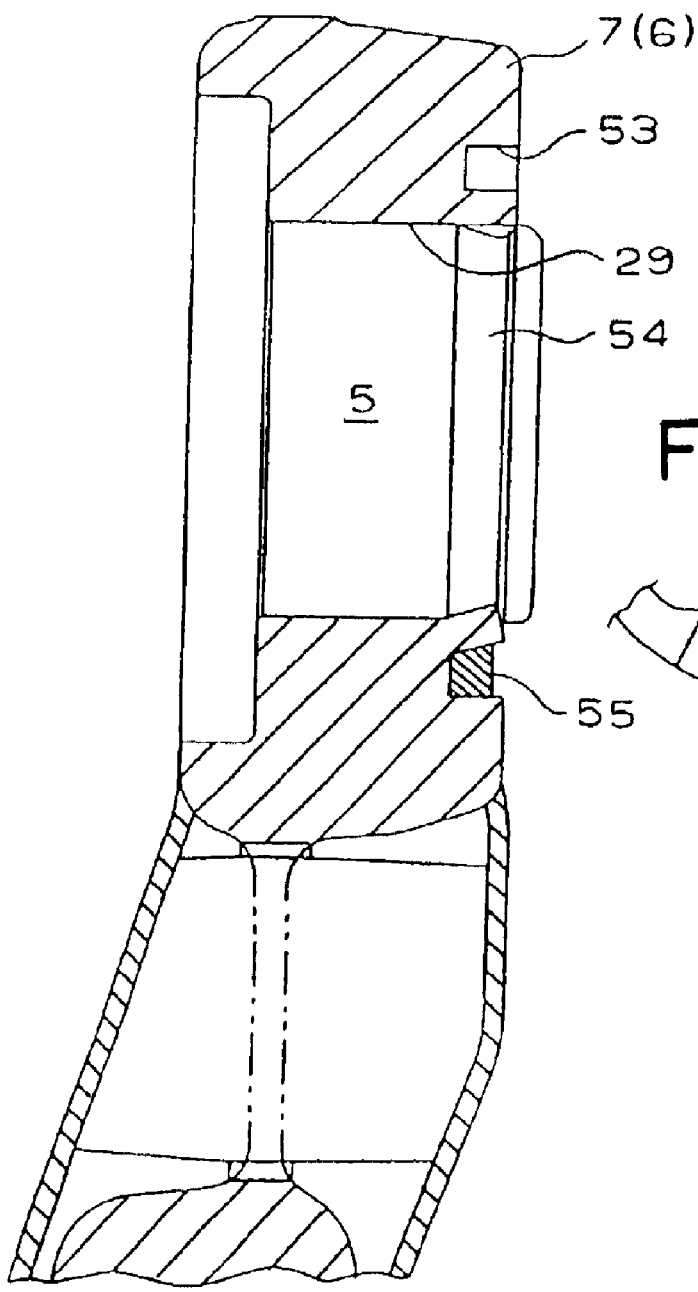
FIGS. 11A and 11B are schematic views showing another example of the fixing structure in which the link side is to be deformed and a structural example of the link with the fixing pressing jig.
Figure 11B:
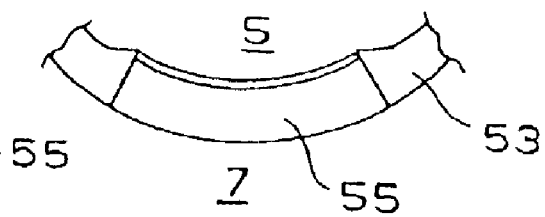

FIG. 11 shows the seventh example of the fixing structure according to the present invention. Circumferential grooves 53 for press-fitting wedge-like members, each of which has side wall surfaces substantially in parallel to each other, are previously formed in the opening peripheral edge portion of the pin-press-fitting hole 20 on the fixing end surface of the link 7. Further, a ring-like groove portion 54, which has a right angled triangular cross sectional shape, is formed on an outer peripheral surface of the press-fitting end portion in the pin 5. After the pin 5 is press-fitted into the pin-press-fitting hole 29 of the link 7 having the above mentioned structure, a plurality of arcuate wedge-like members 55 are fitted and inserted into the circumferential grooves 53 of the link 7 for press-fitting the wedge-like members with a predetermined phase difference.

Next, the press machine (not shown) is operated, and then the arcuate wedge members 55 are pressed along the axis of the pin 5 by means of the fixing push jig 43 which is mounted to the press machine. As a result, the inner peripheral sides of the circumferential grooves 53, into which the arcuate wedge members 55 are fitted and inserted, are partially deformed and protruded toward the center and are fitted to and engaged with the ring-like groove portion 54 which is formed in the end portion of the pin 5. The cross sectional shape of each of the arcuate wedge members 55 assumes substantially a trapezoidal shape. At this time, in the same manner as shown in FIG. 9D, the surface hardness of the annealed partial surface A of the opening peripheral edge portion is formed so as to be HRC 25 to 40, and the surface hardness of the surface B of the non-plastically deformed portion in the link 7 is formed to be HRC 30 to 45 by means of hardening.

FIG. 12 shows the eighth example of the fixing structure according to the present invention. In this example of the fixing structure, the arcuate wedge member 55 as mentioned above has a circular cross sectional shape. The structure of the link 7 is substantially the same as the sixth example of the fixing structure as mentioned above. However, in the present example of the fixing structure, a ring-like continuous recessed portion 56 is formed in the end portion of the pin 5. After the arcuate wedge members 55, each of which has a circular cross section, are previously fitted and attached to the circumferential groove 53 of the link 7 for press-fitting the wedge-like members 55, the arcuate wedge members 55 are pressed into the inner portion of the circumferential grooves 53 by means of the fixing push jig 43 which is mounted to the press machine (not shown). In accordance with the press-fitting, part of each of the circumferential grooves 53 on an inner peripheral surface side thereof is expanded to the recessed portion 56 of the pin 5 so as to be engaged therewith. At this time, in the same manner as shown in FIG. 12C, the surface hardness of the annealed partial surface A of the opening peripheral edge portion is formed to be HRC 25 to 40, and the surface hardness of the surface B of the non-plastically deformed portion in the link is formed to be HRC 30 to 45 by means of hardening.

Figures 13A, 13B:
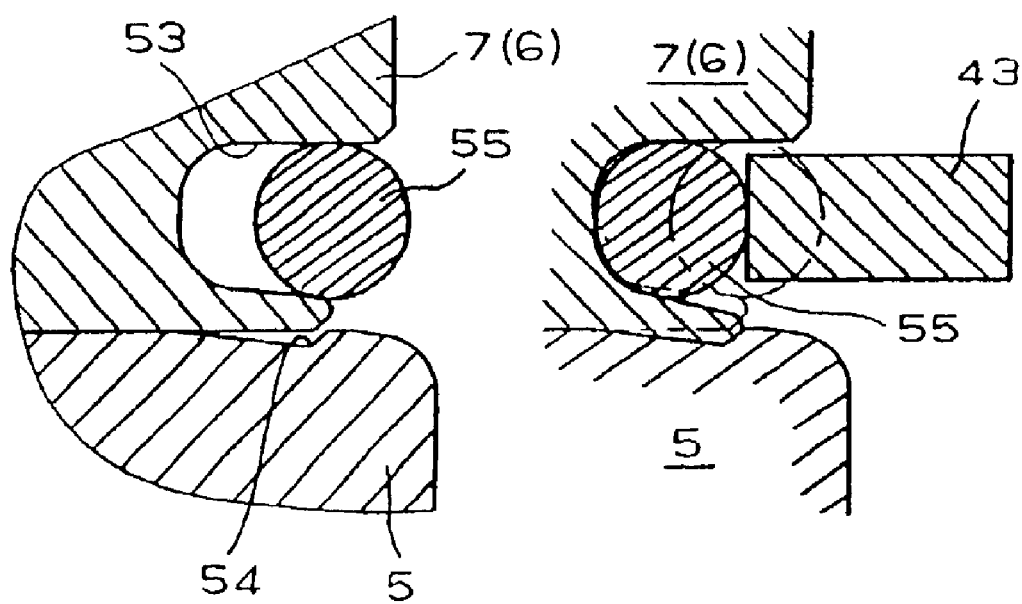
FIGS. 13A and 13B are schematic views showing still another example of the fixing structure in which the link side is to be deformed and a structural example of the link with the fixing pressing jig.

FIG. 13 shows a ninth example of the fixing structure according to the present invention. According to the example of the fixing structure, arcuate members, each of which has a circular cross sectional shape, is employed as the arcuate wedge members 55 in the same manner as that of the seventh example of the fixing structure. Each of the circumferential grooves 53 of the link 7 for press-fitting the wedge-like members 55 is formed to be so short that a free end of an inner peripheral portion 53a thereof can be inserted to the inner side slightly beyond the end surface of the link 7. Further, a ring-like groove portion 54 is formed in the end portion of the pin 5. A part of an inner peripheral surface side of the circumferential groove 53, which is deformed in an inner diameter direction of the link 7 in accordance with the press-fitting of the arcuate wedge members 55 in the same manner as that of the sixth example of the fixing structure, is bent in inner diameter direction to be fitted to and engaged with the ring-like groove portion 54. At this time, in the same manner as shown in FIG. 12C, the surface hardness of the annealed partial surface A of the opening peripheral edge portion is formed to be HRC 25 to 40, and the surface hardness of the surface B of the non-plastically deformed portion in the link is formed to be HRC 30 to 45 by means of hardening.

Figure 14A:
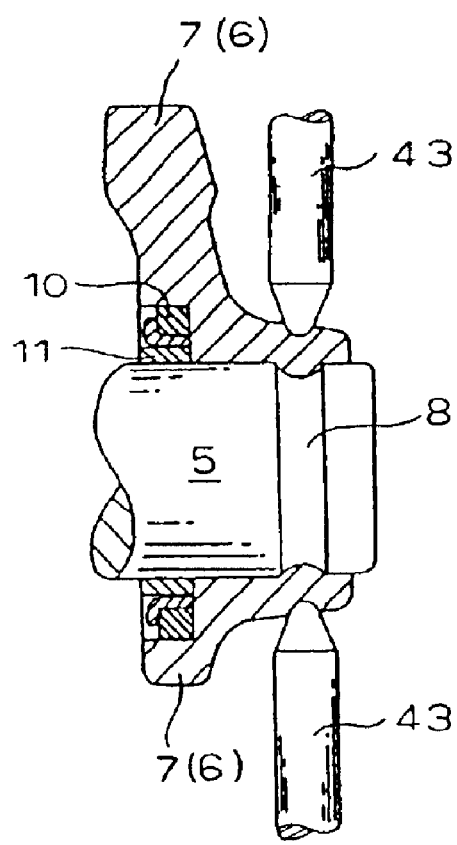
FIGS. 14A and 14B are schematic views showing still another example of the fixing structure in which the link side is to be deformed and a structural example of the link with the fixing pressing jig.
Figure 14B:
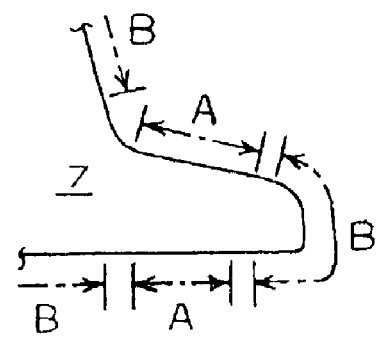

FIG. 14A shows a tenth example of the fixing structure according to the present invention. According to this fixing structure, the outer peripheral end surface of the link 7 forms a protruding portion by means of application of the pressing force in the diametrical direction by the fixing push jig 43, and then the protruding portion is fitted to and engaged with an annular groove 8 which is formed in the end portion of the pin 5. At this time, as shown in FIG. 14B, the surface hardness of the partial surface A which corresponds to the plastic deformation in the link 7 is formed to be HRC 25 to 40, and the surface hardness of the surface B of the non-plastically deformed portion in the link 7 is formed to be HRC 30 to 45 by means of hardening.

As mentioned above, in the embodiments according to the present invention shown in FIGS. 7 to 14, the same effects as those of the embodiments shown in FIGS. 1 to 6, which are peculiar to the present invention, can be achieved. Furthermore, it is possible to securely perform the plastic deformation with a small pressing force, and it is possible to perform the plastic deformation without generating any brittle fracture. Further, even in the case of making a press-fitting margin of the pin-press-fitting hole formed in the link less than the conventional one and press-fitting the pin with a smaller press-fitting force than the conventional one, it is possible to firmly connect the link and the pin, and further it is possible to secure a sufficient holding force of the link with respect to the axial direction of the pin. Furthermore, it is possible to easily and securely work the pin-removal-preventing structure by utilizing the existing press machine and by means of a fixing push jig attached to the press machine. Further, when the link is taken out from the pin, it is possible to easily take it out with a shearing force which is larger than the holding force without leaving any sliding trace on the peripheral surface of the pin and the pin hole inner surface of the link. Therefore, it is possible to easily perform a fixing phase changing operation of the pin with respect to the link. Further, since only a small pressing force is required and it is possible to securely plastically deform even in the case of using an exclusive machine, it is possible to improve a working accuracy and to increase productivity.

As is understood from the description mentioned above, the present invention should not be limited to the embodiments as mentioned above, and various modification in design can be performed within the scope of the present invention.

What is claimed:

1. A fixing structure between a link and a pin in a crawler belt, comprising:

a track block;

a link having a pin-press-fitting hole defined therein and a pair of the links attached to the track block;

a bushing disposed between the pair of links; and a pin having a circular cross section and disposed within the pin-press-fitting hole and the bushing, wherein the link and the pin are fixed by plastically deforming a pin end surface or a part of a peripheral edge of the pin-press-fitting hole in a radial direction crossing a center of the pin, and wherein a surface hardness of at least a partial surface of a portion to be plastically deformed is formed to be lower than a surface hardness of a portion not to be plastically deformed in the pin or the link before being plastically deformed.

2. A fixing structure between a link and a pin in a crawler belt according to claim 1, wherein the surface hardness of the partial surface is formed by lowering the hardness by annealing.

3. A fixing structure between a link and a pin in a crawler belt according to claim 1, wherein the partial surface is the pin end surface, and the surface hardness of the partial surface is set to be in the range of Rockwell C 25 to 40, and the surface hardness of the surface of the portion not to be plastically deformed in the pin is set to be in the range of Rockwell C 53 to 63.

4. A fixing structure between a link and a pin in a crawler belt according to claim 2, wherein the partial surface is the pin end surface, and the surface hardness of the partial surface is set to be in the range of Rockwell C 25 to 40, and the surface hardness of the surface of the portion not to be plastically deformed in the pin is set to be in the range of Rockwell C 53 to 63.

5. A fixing structure between a link and a pin in a crawler belt according to claim 1, wherein the partial surface is the peripheral edge of the pin-press-fitting hole of the link, and the surface hardness of the partial surface is set to be in the range of Rockwell C 25 to 40, and the surface hardness of the surface of the portion not to be plastically deformed in the link is set to be in the range of Rockwell C 53 to 63.

6. A fixing structure between a link and a pin in a crawler belt according to claim 2, wherein the partial surface is the peripheral edge of the pin-press-fitting hole of the link, and the surface hardness of the partial surface is set to be in the range of Rockwell C 25 to 40, and the surface hardness of the surface of the portion not to be plastically deformed in the link is set to be in the range of Rockwell C 53 to 63.

7. A fixing structure between a link and a pin in a crawler belt according to claim 1, wherein a plastic deformation is made by a pressing force in the radial direction crossing the center of the pin.

8. A fixing structure between a link and a pin in a crawler belt according to claim 1, wherein a plastic deformation is made by a pressing force in a direction parallel to a central axis of the pin.

9. A fixing method between a link and a pin in a crawler belt having a track block, a link having a pin-press-fitting hole defined therein, a pair of the links attached to the track block, a bushing disposed between the pair of links, and a pin having a circular cross section, the fixing method comprising the step of:

applying a surface treatment to a partial surface of a pin end surface or a peripheral edge of the pin-press-fitting hole such that a surface hardness of the partial surface becomes lower than a surface hardness of a surface of a portion not to be plastically deformed in the pin or the link;

press-fitting the pin into the bushing and the pin-press-fitting hole of the link; and fixing the link and the pin by plastically deforming the partial surface applied with the surface treatment thereto in a radial direction connecting a center and a periphery of the pin.

10. A fixing method between a link and a pin in a crawler belt according to claim 9, comprising the step of providing a pressing force in a direction parallel to a central axis of the pin for a plastic deformation.

* * * * *